US008060367B2

(12) United States Patent
Keaveney

(10) Patent No.: US 8,060,367 B2
(45) Date of Patent: Nov. 15, 2011

(54) SPATIALLY INDEXED GRAMMAR AND METHODS OF USE

(75) Inventor: John F. Keaveney, San Diego, CA (US)

(73) Assignee: Targus Information Corporation, Vienna, VA (US)

( * ) Notice: Subject to any disclaimer, the term of this patent is extended or adjusted under 35 U.S.C. 154(b) by 832 days.

(21) Appl. No.: 11/768,433

(22) Filed: Jun. 26, 2007

(65) Prior Publication Data

US 2009/0006077 A1    Jan. 1, 2009

(51) Int. Cl.
G10L 17/00    (2006.01)

(52) U.S. Cl. ............................................. 704/247; 704/9

(58) Field of Classification Search .................. 704/247, 704/9

See application file for complete search history.

(56) References Cited

U.S. PATENT DOCUMENTS

| | | |
|---|---|---|
| 5,040,127 A | 8/1991 | Gerson |
| 5,054,082 A | 10/1991 | Smith et al. |
| 5,506,897 A | 4/1996 | Moore et al. |
| 5,524,169 A | 6/1996 | Cohen et al. |
| 5,897,616 A | 4/1999 | Kanevsky et al. |
| 5,905,773 A | 5/1999 | Wong |
| 5,940,793 A | 8/1999 | Attwater et al. |
| 5,948,061 A | 9/1999 | Merriman et al. |
| 6,028,537 A | 2/2000 | Suman et al. |
| 6,184,823 B1 * | 2/2001 | Smith et al. ............... 342/357.13 |
| 6,314,402 B1 | 11/2001 | Monaco et al. |
| 7,036,128 B1 | 4/2006 | Julia et al. |
| 7,616,964 B2 * | 11/2009 | Riise et al. .................. 455/456.1 |
| 2002/0111810 A1 * | 8/2002 | Khan et al. ..................... 704/275 |
| 2004/0076279 A1 * | 4/2004 | Taschereau ............... 379/218.01 |
| 2005/0096991 A1 * | 5/2005 | Main et al. ....................... 705/22 |
| 2008/0010274 A1 * | 1/2008 | Carus et al. ....................... 707/5 |

FOREIGN PATENT DOCUMENTS

EP    0 661 688 A2    7/1995

OTHER PUBLICATIONS

Courtney, Phillip E., "e*Index Global Identifier," *eAI Journal*, Feb. 2001, p. 58, vol. 3, No. 2, San Mateo, CA, USA.

* cited by examiner

*Primary Examiner* — Jakieda Jackson
(74) *Attorney, Agent, or Firm* — Procopio, Cory, Hargreaves & Savitch LLP

(57) ABSTRACT

Improved systems and methods are described which simplify the individual's interaction with speech recognition software, expand the database of spoken point names that can be recognized, and increase the quality and therefore likelihood of success of speech recognition applications. The present systems and methods apply to various uses, such as providing driving directions, finding the nearest location based service, and finding the nearest "Where Am I?" type of location based services.

39 Claims, 10 Drawing Sheets

SPATIALLY INDEXED GRAMMAR AND METHODS OF USE

BACKGROUND

1. Field of the Invention

The present invention relates generally to speech recognition applications.

2. Related Art

Speech recognition and its associated software performs a process of converting a speech signal to a sequence of words or text, by means of an algorithm implemented as a computer program. Speech recognition software requires a grammar in order to operate. The grammar is the domain, which represents the valid responses to input prompts. Speech recognition software is most efficient and successful when the grammar is as small as possible. For example, a grammar, which has only two words, "YES" and "NO", would work very efficiently, especially when used in conjunction with a large number of unknown speakers communicating over a public network.

Geocoding is the process of assigning geographic identifiers (e.g., codes or geographic coordinates expressed as latitude-longitude) to map features and other data records. A geocoder or geocoding application is a piece of software or a (web) service that helps in this process. Current speech geocoding applications typically use grammars that include ZIP codes, and therefore require an individual user to speak or enter a ZIP code to begin the geocoding application.

For example, a speech recognition application can choose a grammar associated with the ZIP code 92109 when the individual speaks "92109" in response to a voice prompt. Choosing such a grammar can have the above-described advantage of reducing the size of the grammar thereby increasing the efficiency of the speech recognition software.

Such solutions are lacking, however, for several reasons. First, a main purpose of speech recognition and associated geocoding is to assist individuals that are in unfamiliar surroundings. For example, an individual might need directions or a location-based service when the individual is on vacation or trying to locate an unfamiliar place. Therefore, in many scenarios where the application of speech geocoding is helpful, the individual does not know the ZIP code related to the unfamiliar location.

Second, grammars that are stored as ZIP codes are not spatially exhaustive, as there are geographic regions in the U.S. that ZIP codes do not cover. Thus, speech geocoding applications based on ZIP codes will not work in all areas.

Third, ZIP codes typically are associated only with addresses, not intersections. A single intersection may be located on the border of four different ZIP codes, for example. Therefore, in such an application, if the speech recognition software does not find a match between the spoken location and a ZIP code grammar on the first attempt (after loading the initial ZIP code grammars), the application would likely move to the next higher level of geography, such as a city boundary. This method of geographic area hierarchy is difficult to maintain and can cause geocoding applications to quickly expand to regions that are too expansive, resulting in an unnaturally large sets of grammars. An unnaturally large set of grammars has a negative impact on speech recognition performance and success as previously described.

Therefore, what is needed is a system and method that reduces or overcomes these significant problems found in the conventional systems as described above.

SUMMARY

Embodiments described herein provide for a system and method for building and utilizing a spatially indexed grammar.

In one aspect, a method is provided for building a tile-based (or spatially indexed) grammar containing grammars for first level identifiers (or points) and an index into the tile-based grammar. The method includes partitioning feature names spatially using a spatial index and tiling or partitioning geographic areas into finite, manageable regions (tiles). Building a spatially indexed grammar offers a solution to the problem of partitioning large amounts of data into relevant, concise, manageable sets of grammars that speech recognition engines can effectively utilize.

To utilize the spatially indexed grammar, a spatially indexed grammar engine can use a latitude/longitude coordinate obtained from any of the multiple known geographic areas, such as a city center for example, as an index for obtaining a grammar associated with an initial tile. Through an iterative process of expanding about the initial tile in the spatially indexed grammar, the spatially indexed grammar engine is guaranteed to provide a feature to the speech recognition software that matches a spoken point name (or a point name determined by other means) if it exists at some level in the spatially indexed grammar. The above-described method generates an ever expanding, spatially relevant, minimal set of feature names for recognition.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a spatially indexed grammar and methods of use. After reading this description, it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

In the context of speech recognition, there are two distinct types or levels of human recognizable identifiers for identifying a location on the earth. The first level of identifiers identify specific points. They can be in the form of, for example, a street number and name, an intersection of two named streets or a landmark name, like the "Empire State Building," all of which can be associated with a coordinate location on the earth such as a latitude and a longitude.

The second level of identifiers identify overlapping, commonly known geographic areas, for example: ZIP code, city, county, minor civil division, unincorporated place, etc. The points associated with first level identifiers are usually contained within second level geographic areas.

As disclosed herein, a tile defines an area on the surface of the earth and in one embodiment the defined area is a more or less symmetrical shape defined by a coordinate system and can have a spatially proximate relationship to other tiles. In one example, each tile is substantially rectangular although each tile's exact shape may change slightly depending upon its location on earth (e.g., its latitude and longitude).

As further disclosed herein a spatially indexed grammar is a collection of grammars (e.g., audio files) derived from feature names of the first level of identifiers, which include, but are not limited to: street names and numbers, intersections of two named streets, and landmarks. Each grammar in the collection of grammars is associated with one tile. The grammar and is derived from feature names of the first level of identifiers in the area defined by the tile and is included in a tile file.

As further disclosed herein the tile file is a file that is associated with one grammar in the collection of grammars that make up the spatially indexed grammar. Each tile file's grammar corresponds to the features that exist geographically within the tile that the tile file represents. Specific embodiments of these data structures are described below.

Figure 1:
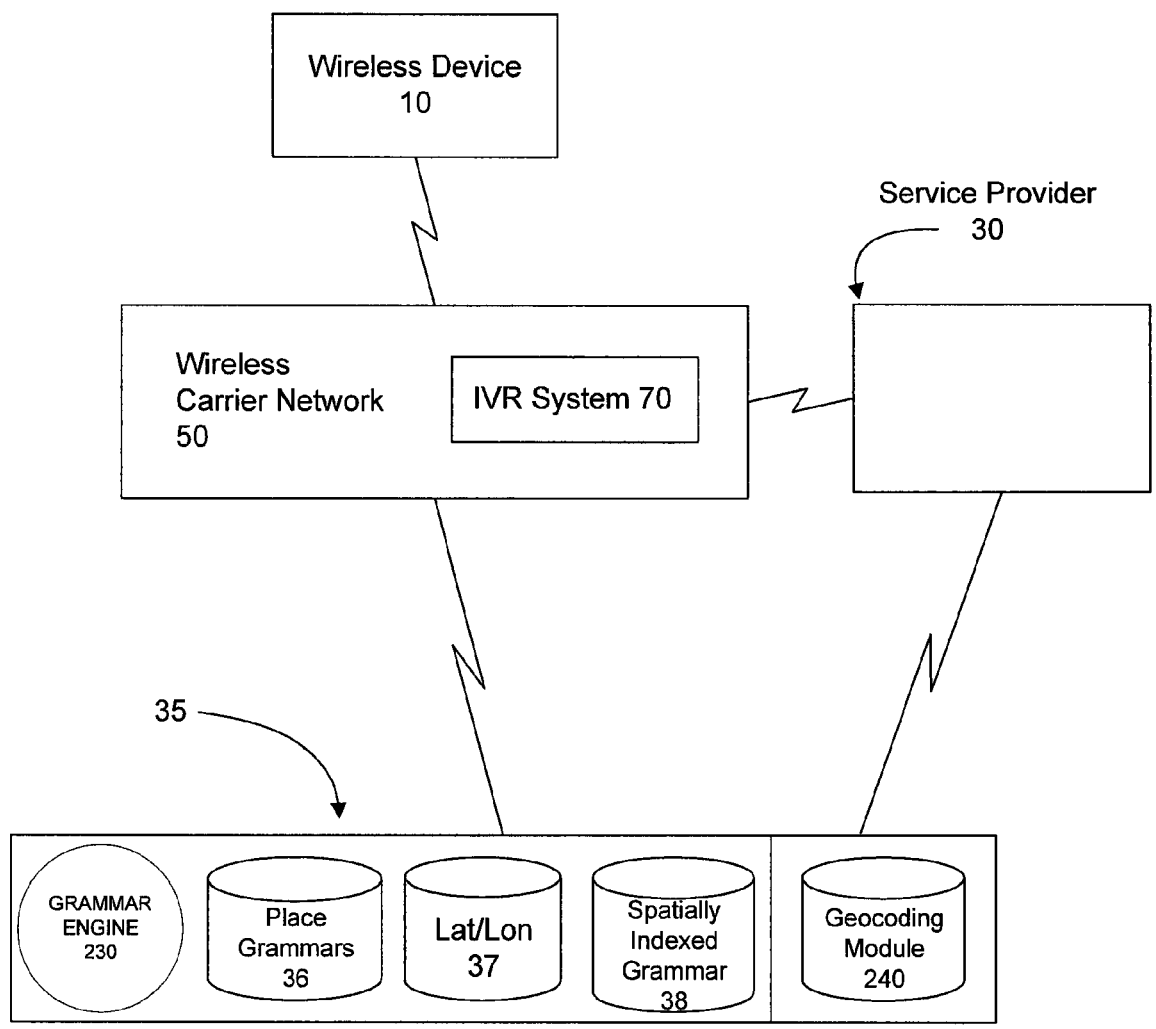
FIG. 1 is a block diagram of a system employing an exemplary embodiment of the present invention.

FIG. 1 is a block diagram illustrating selected elements of a simplified example of a communication system. The system includes a wireless device 10 connected to a network, such as a wireless carrier network 50. In the illustrated embodiment, the wireless device 10 connects to an Interactive Voice Response ("IVR") system 70 via the wireless carrier network 50. The IVR system 70 accesses a spatially indexed grammar and geocoding system 35. The spatially indexed grammar and geocoding system 35 provides location specific grammars (e.g., audio files) to the IVR system 70 and point coordinates (e.g., a latitude and a longitude) for use, for example, by a service provider 30. The service provider 30 can be various types of merchants or providers of services that provide a location based service ("LBS"). In one embodiment, the service provider 30 uses the point coordinate from the spatially indexed grammar and geocoding system 35 to provide a service to the wireless device 10. There are many service providers capable of receiving a point coordinate from the spatially indexed grammar and geocoding system 35. For the purpose of simplicity only one service provider 35 is shown.

The wireless carrier network 50 includes one or more of the IVR systems 70. The wireless carrier network 50 represents those aspects of a wireless network, such as a cellular telephone network, that are not explicitly depicted in FIG. 1. While FIG. 1 illustrates the IVR system 70 as part of the wireless carrier network 50, the IVR system 70 may also be located outside of the wireless carrier network 50. For example, the IVR system 70 may be located on one or more servers connected to the wireless carrier network 50 through a network, such as the Internet. Additionally, the IVR system 70 can be a component of the service provider 30.

As described below in more detail, a computer server system can operate the spatially indexed grammar and geocoding system 35. The spatially indexed grammar and geocoding system 35 includes a grammar engine 230, place grammars 36, a latitude/longitude database 37, a spatially indexed grammar 38, and a geocoding module 240.

The grammar engine 230 implements the process to access the place grammars 36, the latitude/longitude database 37, and the spatially indexed grammar 38 and provide the associated data to the IVR system 70 or the geocoding module 240. The place grammars 36 are a database or other data storage system of grammars derived from feature names associated with locations. The place grammars 36 can be derived from a U.S. Geographic Information Service State & Topical Gazetteer file. The U.S. Geographic Information Service State & Topical Gazetteer file contains place names, including state, city and neighborhood, for example. The place grammars 36 can be organized hierarchically by state, county, and city, for example. In one embodiment, the place grammars 36 are derived from the U.S. Geographic Information Service State & Topical Gazetteer file by removing duplicates where duplicates are defined as having the same place name and county.

The latitude/longitude database 37 is a database or other data storage system, which associates latitude and longitude coordinates with places that correspond to features in the place grammars 36. Each place name is associated with a single coordinate. Although the latitude/longitude database 37 is described with respect to various embodiments of the invention, it should be noted that other databases can be used as well such as a database of V and H coordinates, for example. In general, the latitude/longitude database 37 is interchangeable with any database capable of providing a coordinate system for use as described herein. In one embodiment, the place grammars 36 and the latitude/longitude database 37 are combined into a single set of fixed length files containing a place name, a county, a latitude, a longitude, and a type.

The spatially indexed grammar 38 is a collection of grammars (e.g., audio files) derived from the first level of identifiers (feature names). The spatially indexed grammars can be organized as a database or other data storage system. The audio files corresponding to feature names in the collection of grammars that make up the spatially indexed grammar 38 include, but are not limited to: street names and numbers, intersections of two named streets, and landmarks. Each grammar in the collection of grammars is associated with one tile. In one embodiment, the audio files for the grammar for each tile is associated with a tile file, the structure of which will be further defined below. The spatially indexed grammar 38 can be indexed in a plurality of manners. In one embodiment, the index into each tile file is derived from a latitude and longitude coordinate that exists in the latitude/longitude database 37. In other embodiments, V and H coordinates are used.

The output from the spatially indexed grammar and geocoding system 35 can be used in other network environments, for example when substituting a wire-line device such as a conventional telephone for the wireless device 10, in which case a different carrier such as a wire-line or VoIP telephony carrier may be substituted for the wireless carrier network 50.

The wireless device 10 may be a cell phone, personal digital assistant ("PDA"), laptop computer, or the like. There are a variety of types of wireless devices 10 and wireless carrier networks 50, with prevalent examples today being personal communication services ("PCS"), global system for mobile communications ("GSM") and code division multiple access ("CDMA") cell phones and networks. As it pertains to the embodiments discussed above and below, the particular protocols of the wireless device 10 and the wireless carrier network 50 are immaterial so long as it is possible to exchange voice and/or data to and from the wireless device 10.

Figure 2:
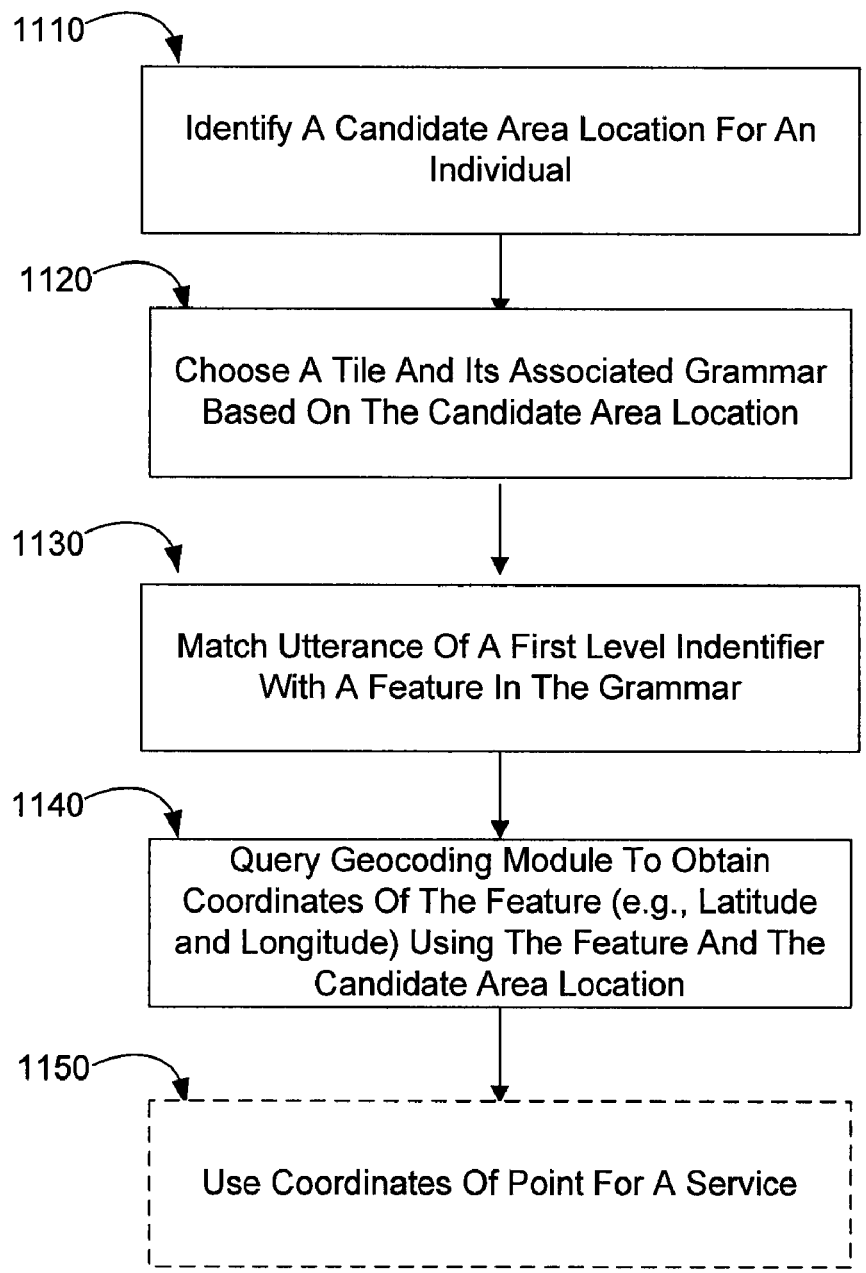
FIG. 2 is a diagram of one embodiment of a process implemented by the system in FIG. 1.

FIG. 2 is a diagram of one embodiment of a process implemented by the system in FIG. 1. At step 1110, the IVR system 70 or the wireless carrier network 50 identifies a candidate area for an individual. For example, the IVR system 70 can prompt the individual for the state or county where they are located an individual can respond by speaking into the wireless device 10. The IVR system 70 captures the individual's utterance and the grammar engine 230 loads a state grammar from the place grammars 36. The IVR system 70 uses speech recognition software to match the individual's utterance against the loaded state grammar. It should be noted that in this particular embodiment, a state grammar has been used to pinpoint a candidate area location but other grammars can be used as well in association with other candidate areas of differing geographic scope. In general, the granularity of the candidate area location can change depending on the needs of the system, the size of the grammars, or the type of IVR system, for example.

In one embodiment, if the IVR system 70 matches the individual's utterance to one of the states, then it can further prompt the individual for the city where they are located. In response, the grammar engine 230 loads a city grammar for that particular state from the place grammars 36 and the IVR system 70 matches the individual's utterance against the loaded city grammar. Once the IVR system 70 matches the individual's utterance to a city in the place grammars 36, it has identified the candidate area. Alternatively, the wireless carrier network 50 can provide the closest switch location associated with the individual's wireless device 10 or the closest cell tower location associated with the individual's wireless device 10 to identify the candidate area.

At step 1120, the grammar engine 230 selects a tile file and provides it to the IVR system 70. For example, if the candidate area location was "San Diego," the initial tile file that the grammar engine 230 chooses may be the tile file that corresponds to the tile that is more or less centered geographically within San Diego. The process of choosing the initial tile file may include accessing the latitude/longitude database 37 in order to access a latitude and longitude coordinate associated with the candidate area location. The grammar engine 230 uses the latitude and longitude coordinate to compute an index. The grammar engine 230 uses the index as a basis for choosing one of the tile files in the spatially indexed grammar 38 and provides the tile file to the IVR system 70.

Thereafter, at step 1130, the IVR system 70 prompts the individual to utter a first level identifier. The individual can provide a spoken location description of the first level identifier in a manner similar to the manner in which the IVR system 70 determined the candidate area location. The first level identifier can be a point, such as a landmark or an intersection of two or more streets, for example. The IVR system 70 then attempts to match the utterance with the audio files corresponding to the features included in the initial grammar provided at step 1120. If the IVR system 70 successfully matches the individual's utterance to an audio file for a feature name in the provided grammar, it sends a text representation of the feature name to the grammar engine 230.

At step 1140, the grammar engine 230 queries the geocoding module 240 using the text representation of the first level identifier (e.g., the feature in the grammar) and the candidate area location, in order to obtain point coordinates associated with the feature. The point coordinates associated with the feature can be a latitude and longitude coordinate, an Ordinance Survey Coordinate, or any other specific point coordinate type. Optionally, at step 1150 a service provider uses the coordinates for the point to perform some a service for an individual, such as an LBS.

For example, assume an individual wants to order Pizza. If the individual is calling in from a hotel in New York City, N.Y. near the Statue of Liberty, and the individual is visiting the city for the first time, they may not be aware of the ZIP Code or other specifics associated with the region. It may be easy for the individual, however, to provide the information for "New York City" and "Statue of Liberty," which can form the basis of a query to the geocoding module at step 1140. Once the geocoding module accesses point coordinates associated with the Statue of Liberty, the optional step 1150 can occur. Step 1150 may include providing the individual with the location of a "Pizza-Hut" that is most proximate to the Statue of Liberty or optionally providing for their call to be routed to that Pizza-Hut location so that they can seamlessly connect with the intended destination without further action from the individual.

Figure 3A:
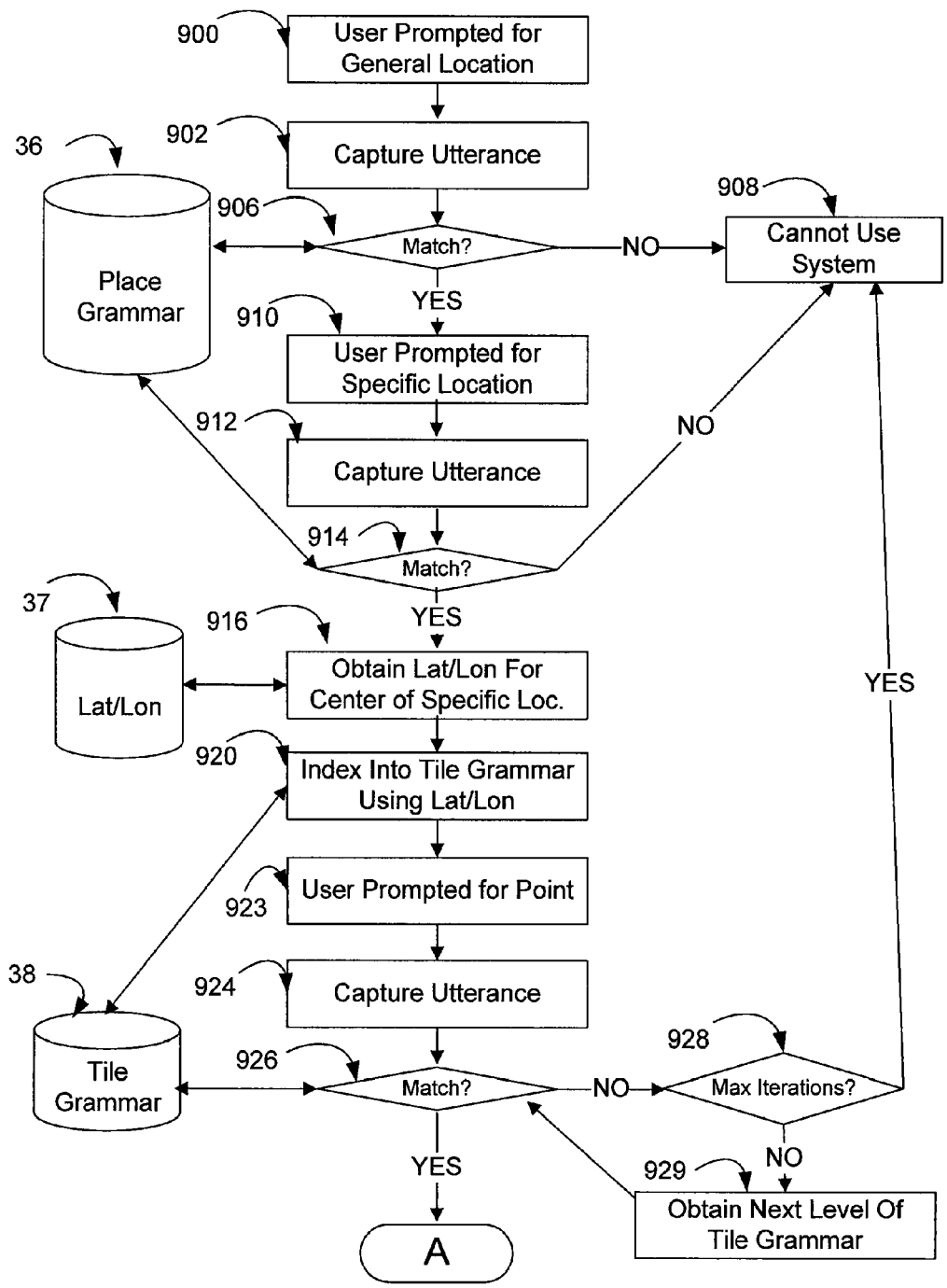
FIG. 3A is a diagram of one embodiment of a process for utilizing a spatially indexed grammar in the context of a "Where Am I?" application.
Figure 3B:
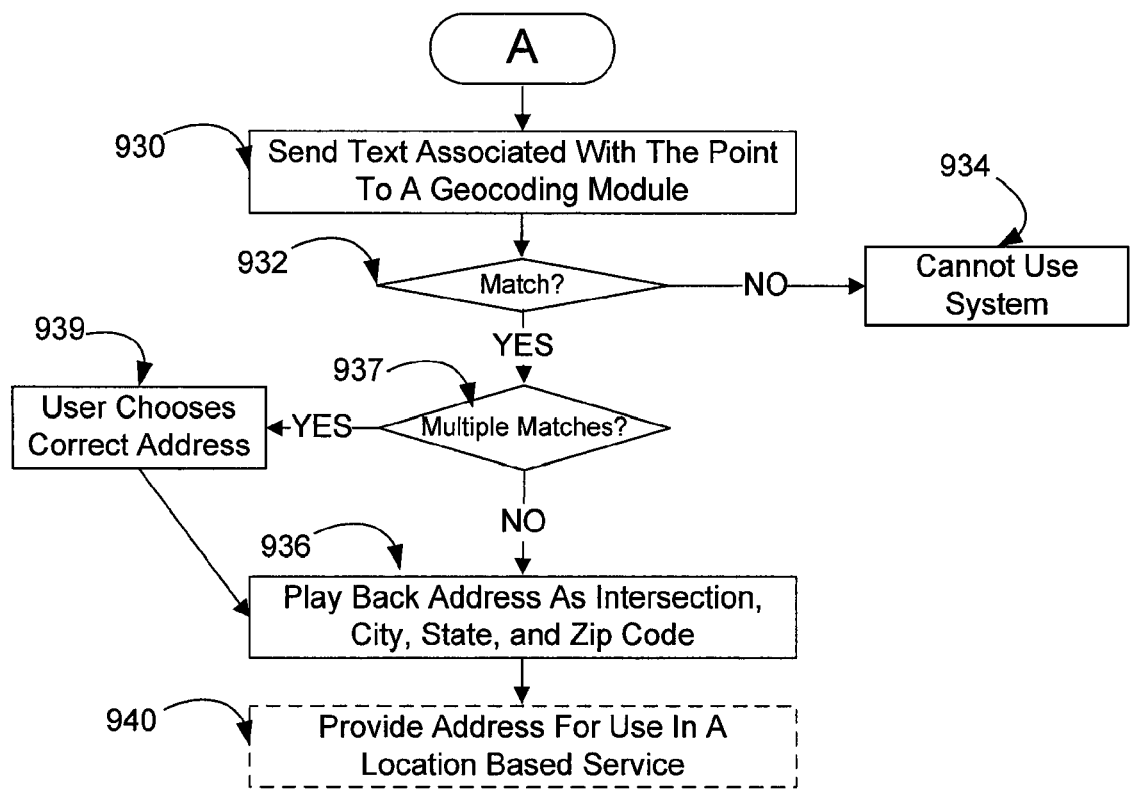
FIG. 3B is a diagram of one embodiment of a process for utilizing a spatially indexed grammar in the context of a "Where Am I?" application.

One use for the grammar engine 230 is in a "Where Am I?" type of application. The steps for using the grammar engine 230 in such an application are shown in FIGS. 3A and 3B. A "Where Am I?" type of application is one where an individual uses the wireless device 10 to query their location, for example, if they are visiting a new city and want to pinpoint their location on a map or determine the closest service to their current proximity. An individual might, for example, want to determine the proximity for the closest coffee shop, Chinese restaurant, or gas station.

In such a scenario, the IVR system 70 first prompts the individual to say the name of the general location where they are located at step 900 and the IVR system 70 captures the utterance at step 902. In the current embodiment, where the general location corresponds to a state, the grammar engine 230 loads a state place grammar file from the place grammars 36.

At step 906, the IVR system 70 compares the utterance against the place grammars 36 and it determines if there is a correct match. If there is no correct match, the individual's location cannot be determined by this means and the process ends at step 908. If there is a correct match at step 906, the IVR system 70 prompts the individual to say the name of a specific location where they are located at step 910 and it captures the utterance at step 912.

In the current embodiment, where the specific location corresponds to a city, the IVR system 70 compares the city name utterance at step 914 against the place grammars 36 to attempt obtain a matched record. If the IVR system 70 finds no record the process proceeds to step 908 and ends. If the IVR system 70 finds a correct match at step 914, then the grammar engine 230 obtains a latitude/longitude associated with the matched record at step 916 from a latitude/longitude database 37.

The grammar engine 230 uses the obtained latitude/longitude for the city to index or query into the tile file associated with the initial tile at step 920. The initial tile can be a centroid tile, which is more or less centered within the obtained specific location. The grammar engine 230 then loads the initial grammar from the tile file into the IVR system 70.

Next, the IVR system 70 prompts the individual to say the street name or names (in the case of an intersection) at step 923 and it captures the utterance at step 924. The IVR system 70 compares the street name utterance against the grammar from the tile file to attempt to obtain a matched feature at step 926. If there is not a correct match, the grammar engine 230 determines at step 928 whether the maximum number of iterations has occurred. If not, the grammar engine 230 sends a second query to the spatially indexed grammar database 38 to index the next higher level of grammars. The next level is generated as will be described subsequently.

The grammar engine 230 repeats the process of indexing the next higher level of grammars at step 929 until all names are matched or the maximum number of iterations is met. If the maximum number of iterations is met without obtaining a correctly matched record, the individual's specific location cannot be determined by this means and the process ends at step 908. If the IVR system 70 matches the street name utterance with a record from the tile file, the grammar engine 230 sends the corresponding text representation of the address/intersection to a geocoding module 240 at step 930 to determine if the address/intersection exists at step 932. If no correct match exists, the process ends at step 934 since no correct match can be found.

If the geocoding module 240 finds a correct match, it can append a latitude/longitude coordinate to the correct match. Once the geocoding module 240 obtains a latitude/longitude match, the individual's location is successfully determined and can be played back to the individual as an address (e.g., intersection, city, state, and ZIP code) at step 936. The address can also be used at step 940 in an LBS (e.g., to provide driving directions or to find the nearest coffee shop, Chinese Restaurant, gas station, etc.) If the geocoding module 240 obtains multiple lat/long matches, the individual is prompted at step 937 to choose the correct record from a list for use in an LBS and the correct record is used at step 939.

Figure 4:
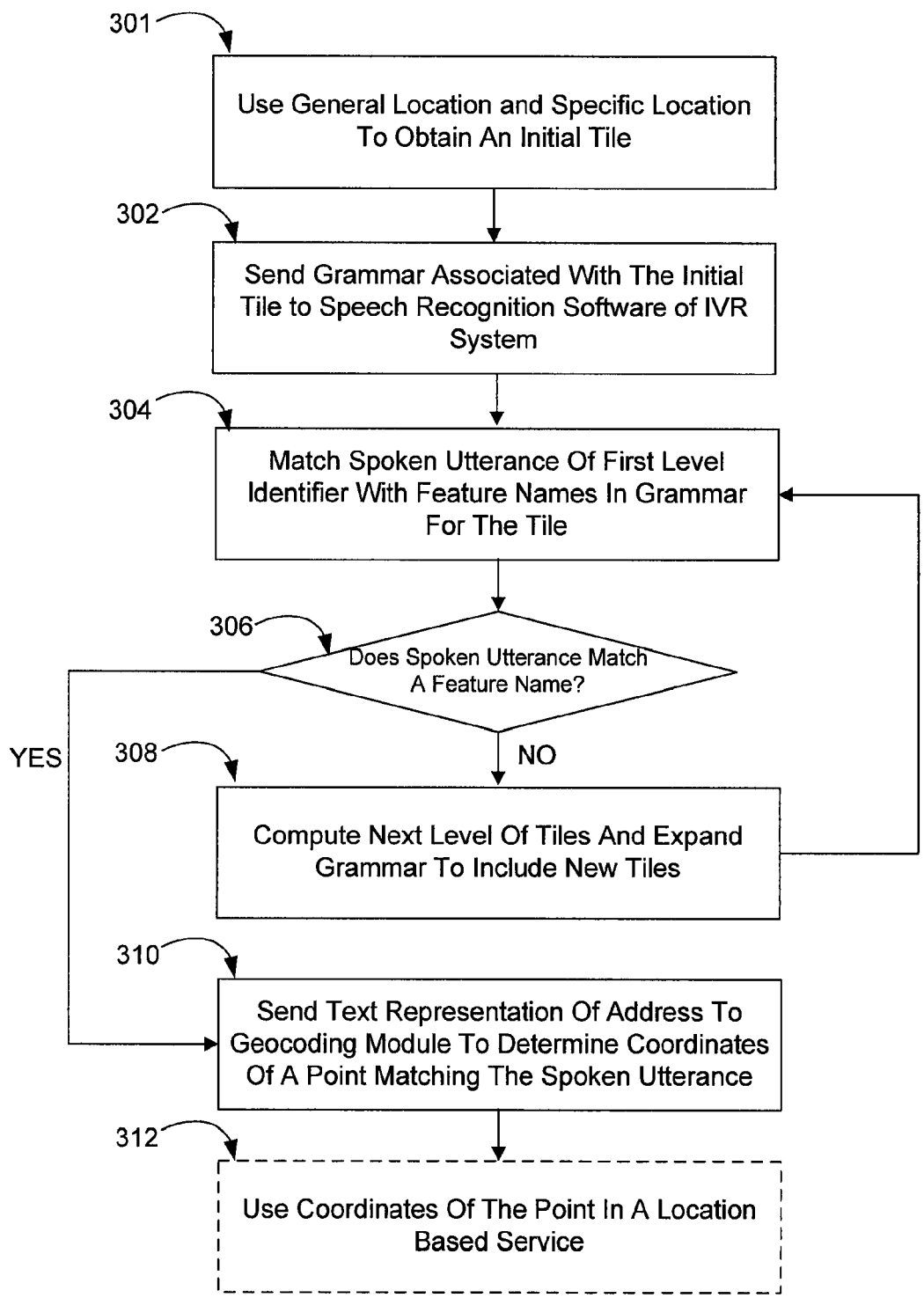
FIG. 4 is a diagram of one embodiment of a process for utilizing a spatially indexed grammar.

FIG. 4 is a diagram of one embodiment of a process for utilizing a spatially indexed grammar. FIG. 4 explains in more detail step 1120 of FIG. 2. The grammar engine 230 of FIG. 1 can implement step 1120 of FIG. 2. The grammar engine 230 works in conjunction with the IVR system and its speech recognition software to determine a point coordinate for the individual's location as follows. At step 301, the grammar engine 230 uses general and specific locations associated with the individual to obtain an initial tile file. The grammar engine 230 can use an input latitude and longitude to access the initial tile file. For example, the grammar engine 230 computes the tile code for the input latitude and longitude and opens the tile file associated with the latitude and longitude. Then, at step 302 the grammar engine 230 returns the grammar of the feature names in the selected tile file to the speech recognition software of the IVR system 70.

At step 304, the speech recognition software of the IVR system 70 matches the spoken utterance of the first level identifier by the individual against the feature names in the initial tile file. At step 306, the speech recognition software of the IVR system 70 determines whether any of the feature names match the spoken utterance. If the IVR system 70 matches the individual's captured utterance with a record from the tile file associated with the initial tile, then at step 310 the grammar engine 230 sends a corresponding text representation of the location (e.g., address or intersection) to the geocoding module 240 to determine if the location exists. If so, the geocoding module 240 determines a point coordinate.

For example, the geocoding module 240, can determine whether the text representation corresponds to a valid address and if so, it can append to it a latitude/longitude coordinate in the provided output. Thereafter, at step 312, an LBS can optionally use the point coordinates, for example by providing driving directions, helping the individual ascertain their location, etc.

However, if after step 306, the IVR system 70 does not match the spoken utterance of the specific location by the individual against the feature names in the tile file, an iterative process begins to expand the grammar and repeat. Therefore, at step 308 the grammar engine 230 computes the indices into a next level of tile files and obtains the new grammar. The new grammar is a superset of the old grammar because it includes the old grammar found in the previous tile file, plus all feature names included in the new tile files that are aggregated into the new grammar when the next level of tile files is computed.

For example, the grammar engine 230 can carry out step 308 by making an additional query to the spatially indexed grammar database 38 to obtain the next higher level set of street or place grammars. The grammar engine 230 can compute the next higher level of tile codes by computing the tile codes surrounding the initial tile, (as will be further defined subsequently). The grammar engine 230 then aggregates the surrounding tiles files into a single set of feature names. This set of feature names can be sorted and after duplicates are removed, returned to the IVR system 70 again.

The grammar engine 230 repeats step 308 as needed. In general, step 308 operates to create a grammar that conforms to Equation 1, where "de-duped" means the removal of all duplicates:

$$\text{Tile Set } (N) = [\text{Sorted \& De-duped } \Sigma(\text{Perimeter Tiles of Tile Set } (N-1))] \quad \text{Equation 1:}$$

Repeating step 308 generates an ever expanding, spatially relevant, minimal set of feature names for the IVR system 70 to operate with, which as previously described provides for enhanced efficiency and accuracy in speech recognition applications. In one aspect, the first four tile set grammars can be pre-built for optimization. While in theory the grammar engine 230 could iterate at step 308 until exhausting all tiles or finding a match, it may not be practical for all applications. A typical application usually sets some geographical limit, thereby limiting the number of iterations to a reasonable number (before deciding to take some other action).

In general operation, the grammar engine 230 iterates to the next level of tiles in the hierarchy of spatial tiles by first indexing into an initial tile and then opening the tile file and the audio files associated with the feature names (i.e., the grammar for the initial tile) and returning them to the IVR system 70.

If the IVR system 70 does not recognize any of the feature names in the grammar for the first tile, the grammar engine 230 fetches the next level of grammars by computing the tile codes surrounding the initial tile. The grammar engine 230 then aggregates the surrounding tile files into a single set of audio files associated with feature names (e.g., a new grammar that includes the feature names for the initial tile and all of the new tiles). The engine repeats this process and the geography represented by the newly expanded and aggregated set of tile files continues until the IVR system 70 finds a match or the geography becomes large enough that the system determines that a match cannot be found and the process ends.

Figure 5:
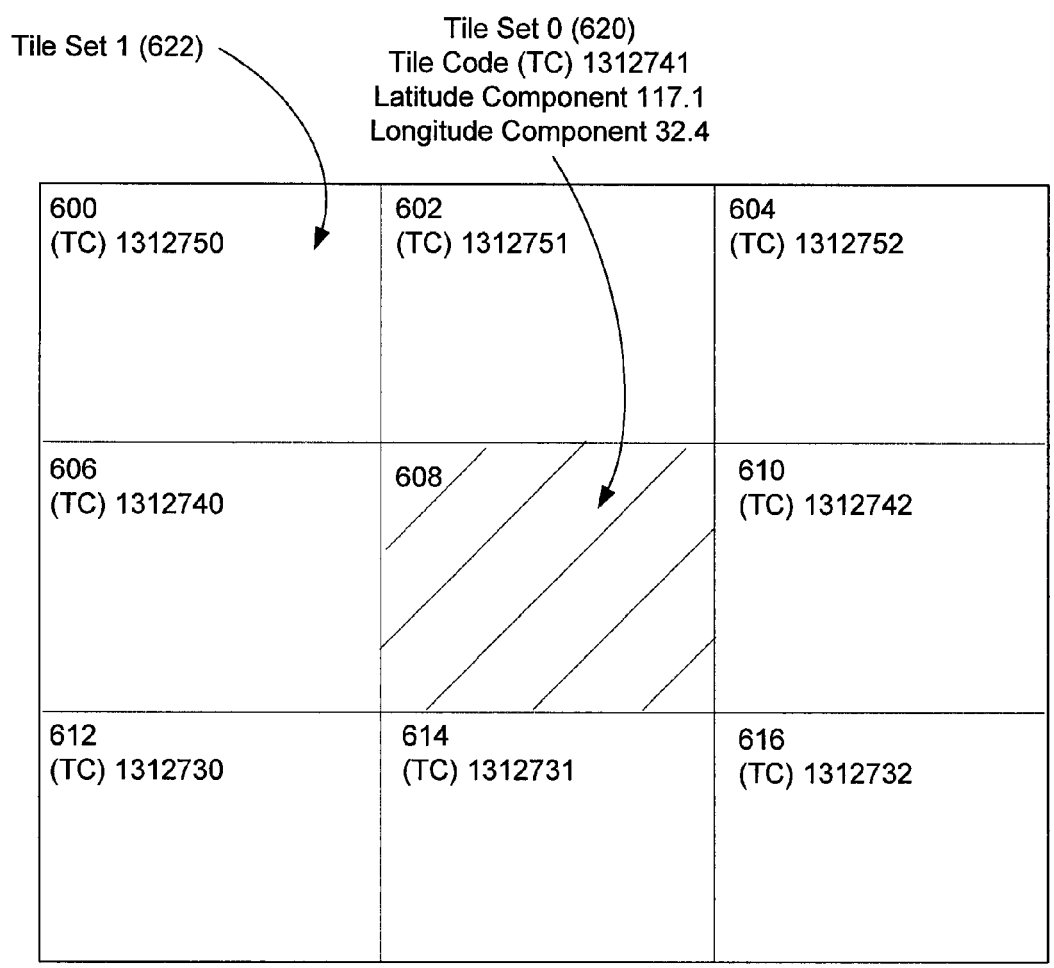
FIG. 5 is a diagram showing one example of how a next level of tiles can be chosen for use in a spatially indexed grammar.

The process by which the grammar engine 230 iterates to the next set of tiles is described in more detail in FIG. 5. In FIG. 5 it is assumed that the initial tile set (Tile 0) 620 includes a single tile 608, which returned a tile having feature names that did not produce a match in the IVR system 70 with the individual's candidate location.

The initial tile 620 has a tile code 1312741, which was computed based on a Latitude component of −117.1 and a Longitude component of 32.4. There are many ways to compute a tile code for an initial tile, so that its surrounding tiles can also be computed. One manner in which the initial tile code for any tile is computed is shown subsequently in FIG. 8. For the purpose of this example, it is assumed that the initial tile code is as shown and the manner in which that tile code is arrived at will be explained later.

The tile set 1 (622) includes tiles 600, 602, 604, 606, 610, 612, 614, and 616. In general, one example of an algorithm that can be used to generate the Latitude and Longitude components of the neighboring tiles (tile set 1) is shown in Equations 2 and 3:

For Tile Set N:

$$\text{Longitude Component} = \text{All Permutations of Longitude Components From [Longitude Component} - (N/10)] \text{ To [Longitude Component} + (N/10)] \quad \text{Equation 2:}$$

For Tile Set N:

$$\text{Latitude Component} = \text{All Permutations of Latitude Components From [Latitude Component} - (N/10)] \text{ To [Latitude Component} + (N/10)] \quad \text{Equation 3:}$$

Using Equations 2 and 3 all unique permutations of tile codes are computed along the perimeter of Tile Set 0. Note that other equations can be used to generate neighboring tiles as long as the neighboring tiles can be computed in a consistent manner.

In the Example of FIG. 5, the following component pairs are generated: (117.0, 32.5), (117.1, 32.5), (117.2, 32.5), (117.0, 32.4), (117.2, 32.4), (117.0, 32.3), (117.1, 32.3), and (117.2, 32.3). These component pairs correspond to tile code 1312750 for tile 600, 1312751 for tile 602, 1312752 for tile 604, 1312740 for tile 606, 1312742 for tile 610, 1312730 for tile 612, 1312731 for tile 614, and 1312732 for tile 616. Note that the tile code for the component pair for tile Set 0 (117.1, 32.4) is omitted.

Figure 6:
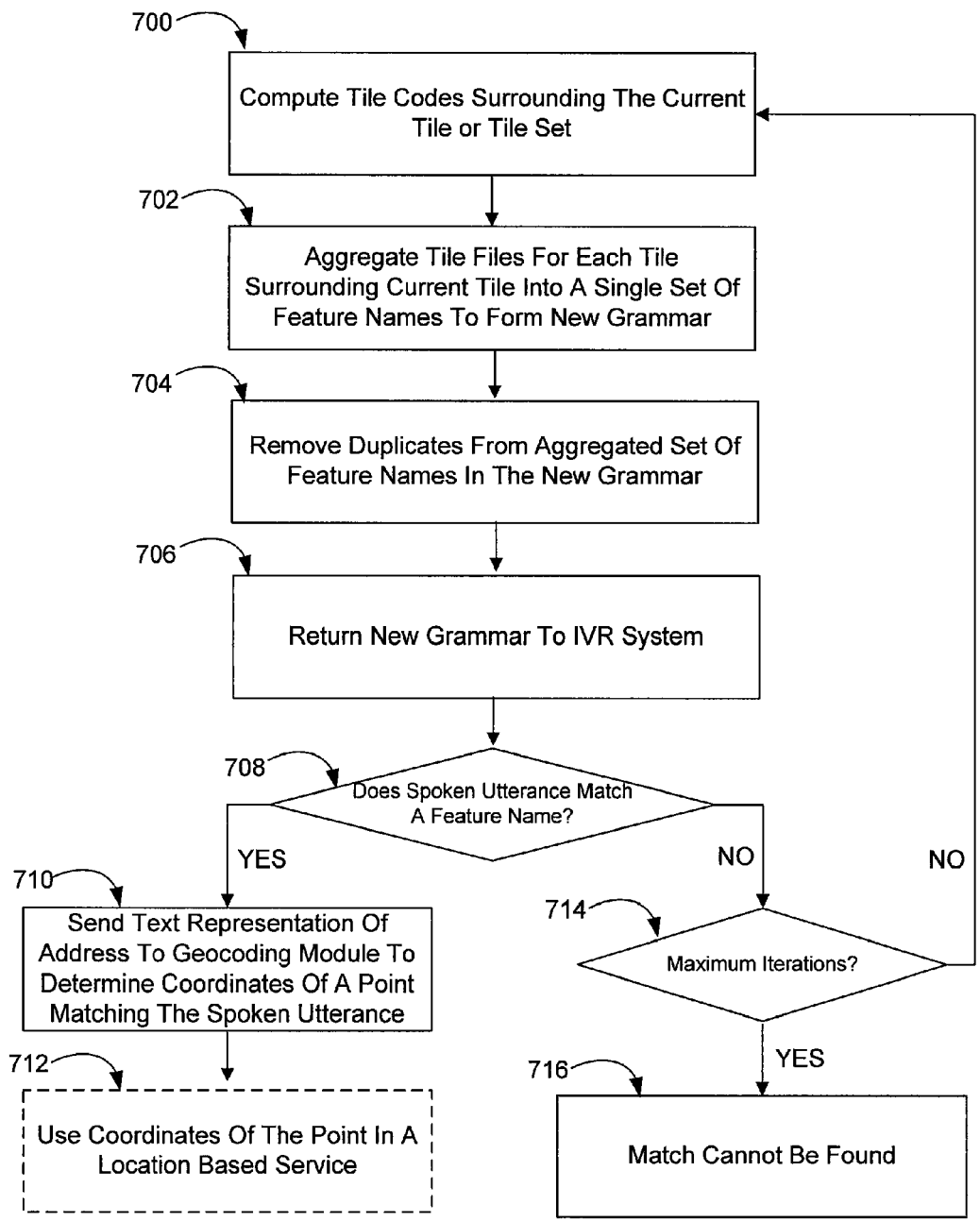
FIG. 6 is a diagram of one embodiment of a process for computing a next level of tiles for use in a spatially indexed grammar.

FIG. 6 shows the steps involved in the operation of the grammar engine 230. The steps in FIG. 6 can apply, for example, in the process of moving from tile set 0 to tile set 1 in FIG. 5. First, the grammar engine 230 computes the tile codes for the tiles surrounding the current tile or tile set at step 700. Next at step 702, the grammar engine 230 opens the tile files for each tile surrounding the current tile and aggregates them into a single set of audio files associated with feature names. The single set of audio files includes the feature names in each of the tile files included in the new set, including the feature names in the original tile file or tile file set. At step 704, the grammar engine 230 removes duplicates from the aggregated set of feature names in the new grammar. Then at step 706, the grammar engine 230 returns the new grammar to the IVR system 70.

The IVR system 70 determines at step 708 whether the spoken utterance of the individual matches an audio file associated with a feature name in the new grammar. If not, the grammar engine 230 determines if the maximum number of iterations has occurred at step 714. For example, the current process may repeat a certain maximum number of times or it may iterate until the grammar engine 230 accesses tile files corresponding to a maximum geographic range. In either case, if the maximum iterations have occurred, a match cannot be found so the process ends at step 716. Otherwise the process repeats at step 700, where a new tile set is computed.

If at step 708 the IVR system 70 matches the spoken utterance with an audio file associated with a feature name in the new grammar, then at step 710 a text representation of the matched feature name (or address) is sent to the geocoding module 240 to determine the coordinates of a point matching the spoken utterance. Thereafter, an optional step 712 can occur where a service provider 30 uses the point coordinates.

The preceding explanations describe the utilization of a spatially indexed grammar and the associated grammar engine 230 and geocoding module 240. The following example will now describe the set-up and/or building of the spatially indexed grammar.

Figure 7:
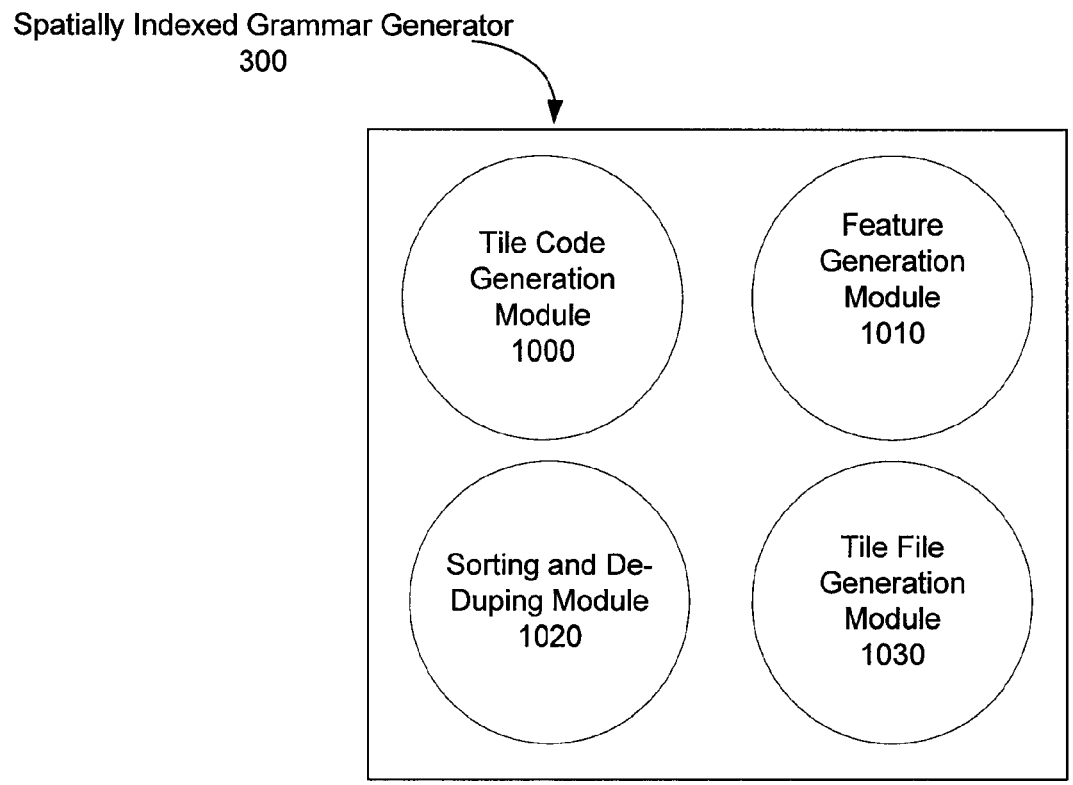
FIG. 7 is a diagram of one embodiment of a spatially indexed grammar generator.

FIG. 7 is a diagram of one embodiment of a spatially indexed grammar generator 300, which can be implemented on a computer. The spatially indexed grammar generator 300 can generate a spatially indexed grammar such as the spatially indexed grammar 38 in FIG. 1. The grammar engine 230 of FIG. 2 uses the output grammar of the spatially indexed grammar generator 300.

The spatially indexed grammar generator 300 includes a tile-code generation module 1000, which it uses to generate tile codes that the grammar engine 230 uses for indexing into the spatially indexed grammar. The spatially indexed grammar generator 300 uses a feature generation module 1010 to classify the features that exist within each tile that have been given a tile code by the tile-code generation module 1000. A sorting and de-duping module 1020 sorts the features and removes duplicates. A tile file generation module 1030 saves each of the features to a flat file, a database, or another data structure representing the features in each tile.

Figure 8:
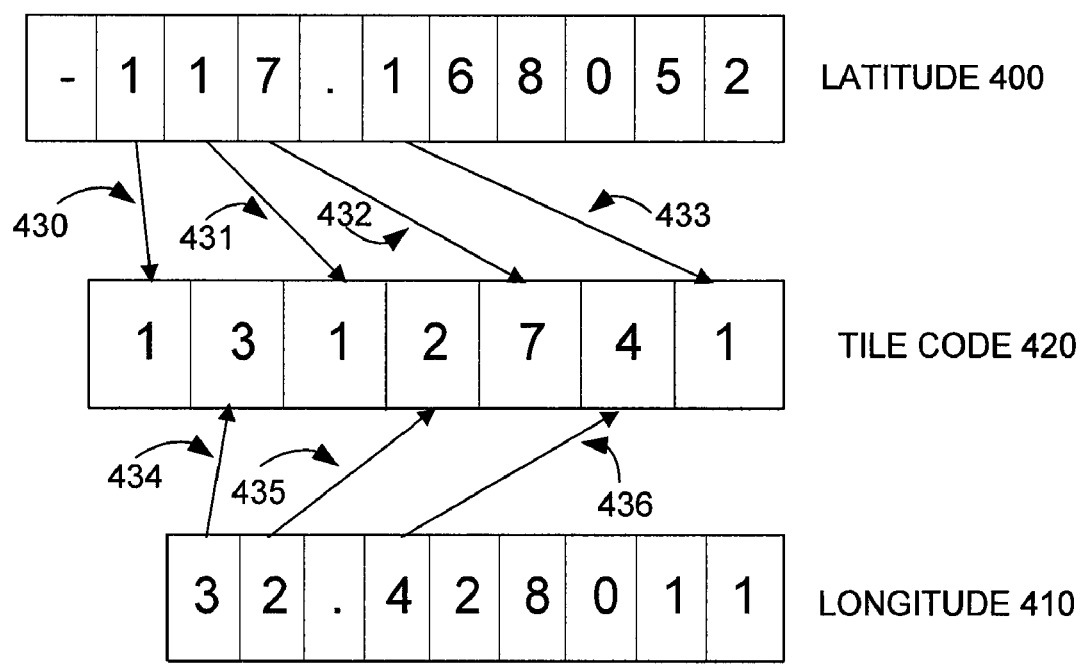
FIG. 8 is a diagram of one example of a latitude and longitude coordinate that a spatially indexed grammar generator uses to build an index into a spatially indexed grammar.

The operation of the tile-code generation module 1000 is described in more detail in FIG. 8, which shows an example of how it builds a tile code for use as an index into a spatially indexed grammar. Other methods of building an index can be used as well, as long as there is some way to compute any given tile's neighbors.

The example of FIG. 8 can be used to build a spatially indexed grammar for any type of geography. In the present example, the tile-code generation module 1000 builds an index for street grammars designed for the geocoding module 240. First, the tile-code generation module 1000 iterates over all roads, streets, highways, trails, etc. and computes a spatial tile code for each feature. The spatial tile code is generated by interleaving latitude and longitude as shown in FIG. 8 for each point in a feature's geography.

In FIG. 8 the example point in the feature's geography has a latitude 400 of −117.168052 and a longitude 410 of 32.48011. In the example of FIG. 8, the resulting 7 byte tile code 420 is 1312741, which is obtained by truncating the latitude 400 and the longitude 410 to tenths and interleaving the digits as shown in arrows 430-436.

Each degree of latitude corresponds to 68.9707 miles so the tile code 420 in the example of FIG. 8 represents a tile of around 6.89707 miles in length. At the equator, the tile therefore would be 6.89707 miles by 6.89707 miles. The latitude and longitude varies as the tile moves away from the equator so the tile sizes change depending on location. For purposes of simplicity, the example tile code of FIG. 8 essentially indexes into an approximately 7 mile by 7 mile square tiles, although the tiles can be smaller or larger if desired by computing the tile code 420 in a different manner. The resulting tile code 420, therefore, represents one of many indices that the tile-code generation module 1000 generates to index into the spatially indexed grammar.

Since the geocoding module 240 typically requires a general location (such as a city name or other candidate area location) along with a specific location (such as a street name), the tile-code generation module 1000 provides its output to the feature generation module 1010. The feature generation module 1010 determines and stores all unique city, place, and ZIP code names for each point along a feature for each tile that is referenced by one of the tile code indexes that the tile-code generation module 1000 generates.

Figure 9:
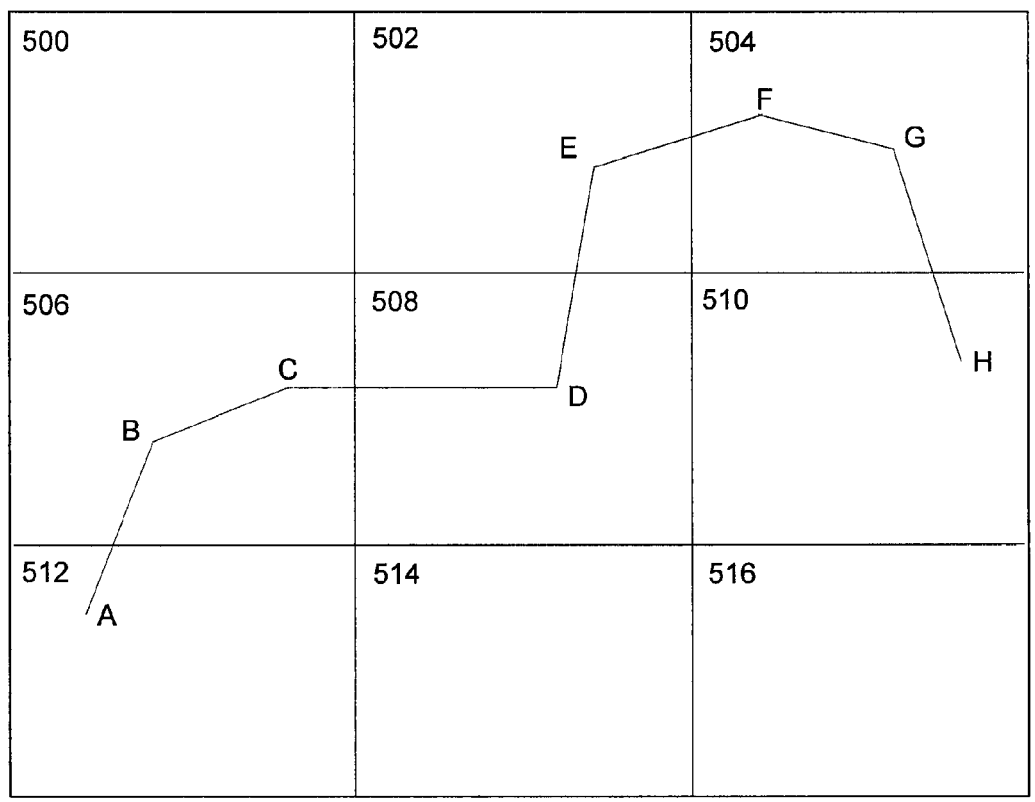
FIG. 9 is a diagram of one example of feature whose nodes are incorporated into tiles by the spatially indexed grammar generator for use with a spatially indexed grammar.

The operation of the feature generation module 1010 is shown in more detail in FIG. 9, which is a diagram of an example that can be used to determine unique names for each point along a feature for use in a spatially indexed grammar. In FIG. 9, the diagram represents the tiling of the nodes on a street. First, the feature generation module 1010 receives a list of unsorted, un-deduped nodes and tile codes.

The example of FIG. 9 lists the tile codes as 500, 502, 504, 506, 508, 510, 512, 514, and 516 for simplicity. As previously explained, the tile-code generation module 1000 can generate the tile codes by interleaving latitude and longitude, which resulted in a 7-digit tile code. A street called "1$^{st}$ Street" runs through tiles 512, 506, 508, 502, 504 and 510. The pre-sorted, pre-deduped list for the example of FIG. 9 would be as shown in Table 1:

TABLE 1

| Node | Tile Code | City | State |
|------|-----------|------|-------|
| A | 512 | San Diego | California |
| B | 506 | San Diego | California |
| C | 506 | Poway | California |
| D | 508 | Poway | California |
| E | 502 | Poway | California |
| F | 504 | Poway | California |
| G | 504 | Poway | California |
| H | 510 | Poway | California |

The sorting and de-duping module 1020 would receive the list represented by Table 1 and sort the tiles for this street segment as 502, 504, 506, 508, 510, and 512. The sorting and de-duping module would remove the duplicate entry represented by nodes F and G, both of which are in the same city, representing the same feature in the same tile (Tile 504).

The tile file generation module 1030 receives the output of the sorting and de-duping module 1020. The tile file generation module 1030 in this example produces a parsed, comma delimited description for "1$^{st}$ Street" along with the associated city/place names. The tile file generation module 1030 writes the description into the tile files for tile codes 502, 504, 506, 508, 510, and 512.

In one example the parsed format is as follows:

Prefix, Street Name, Street Type, Suffix, City0, State0, . . . , CityN, StateN.

In the example of FIG. 6, the tile files are as follows:

File 502:, 1$^{st}$, Street, Poway, Calif.
File 504:, 1$^{st}$, Street, Poway, Calif.
File 506:, 1$^{st}$, Street, Poway, Calif., San Diego, Calif.
File 508:, 1$^{st}$, Street, Poway, Calif.
File 510:, 1$^{st}$, Street, Poway, Calif.
File 512:, 1$^{st}$, Street, San Diego, Calif.

The result of the operation of the tile-code generation module 300 is a set of unique tile files that it opens and creates, the tile files having the feature name "1$^{st}$ Street" written into each file. The tile-code generation module 300 repeats this process for each feature (e.g., "2$^{nd}$ Street," "3$^{rd}$ Street," etc.) The sorting and de-duping module 1020 the sorts and de-dupes features within each tile again.

The result is a set of tile files representing spatial tiles, which contain all of the feature names that reside in that tile and the city/place names for the feature within that tile. The set of tile files can represent every feature in a source database—in this case roads, streets, highways, trails, etc., in the United States, Canada, or elsewhere.

Those of skill will appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular spatially indexed grammar system and design constraints imposed on the overall system. Skilled persons can implement the described functionality in varying ways for each particular spatially indexed grammar system, but such implementation decisions should not be interpreted as causing a departure from the scope of the invention. In addition, the grouping of functions within a module, block or step is for ease of description. Specific functions or steps can be moved from one module or block without departing from the invention.

Moreover, the term latitude and longitude has been used with respect to various embodiments of the present invention. The term latitude and longitude as used herein refers broadly to any system capable of denoting geographic locations on the earth. For example, latitude and longitude coordinates as used in the present disclosure are equally applicable to and interchangeable with a V and H coordinate system or any other coordinate system. The V and H coordinate system is used in many telephone databases to denote a geographic location and/or to calculate the distance between telephone rate centers. The V and H coordinate system is based on Donald elliptic projection. It is a two-point equidistant projection for the continental United States and Canada. It uses units of the square-root of one-tenth of a mile. For example, to calculate the distances between a point 1 and 2 each with V and H coordinates the following formula is used:

[distance in miles=square_root(((V1−V2)2+(H1−H2)2)/10)].

The various illustrative logical blocks and modules described in connection with the embodiments disclosed herein can be implemented or performed with a general purpose processor, a digital signal processor (DSP), a spatially indexed grammar system specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as spatially indexed grammar system specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A non-transitory computer readable medium having stored thereon one or more sequences of instructions for causing one or more processors to perform the steps for speech recognition using tiles, each tile defines an area on the surface of the earth and the defined area is a more or less symmetrical shape defined by a coordinate system and can have a spatially proximate relationship to other tiles, a grammar is associated with each tile and is derived from feature names of first level identifiers in the area defined by the tile and, each first level identifier corresponds to a point on the surface of the earth, the steps comprising:
    identifying a candidate area location;
    choosing an initial tile based on the candidate area location;
    comparing an utterance of a first level identifier against a first grammar associated with the initial tile to determine if the utterance corresponds to a feature from which the first grammar was derived, wherein the grammar comprises an audio file associated with each of the feature names of the first level identifiers associated with the tile, and wherein the utterance corresponds to a feature from which the first grammar was derived if the utterance matches an audio file associated with the first grammar;
    if the utterance does not correspond to a feature in the first grammar,
        determining a plurality of second tiles; and
        comparing the utterance of the first level identifier against the plurality of grammars associated with the plurality of second tiles to determine if the utterance corresponds to a feature from which the plurality of grammars was derived; and
    determining a point coordinate associated with the feature which matches the utterance.

2. The computer readable medium of claim 1, wherein the step of identifying a candidate area location further comprises:
    prompting an individual for the candidate area location; and
    receiving an utterance from the individual of the candidate area location.

3. The computer readable medium of claim 1 wherein the step of identifying a candidate area location further comprises determining a latitude and a longitude from a device associated with an individual.

4. The computer readable medium of claim 1 wherein the step of identifying a candidate area location further comprises determining a location of a communication infrastructure associated with an individual.

5. The computer readable medium of claim 1, wherein the first level identifier includes one or more of a street address, an intersection, or a landmark.

6. The computer readable medium of claim 1 wherein the initial tile and the plurality of second tiles are substantially rectangular geographic regions.

7. The computer readable medium of claim 1 further comprising providing the point coordinate to a location based service.

8. The computer readable medium of claim 1 wherein the step of choosing an initial tile further comprises selecting the initial tile to be substantially centered within the candidate area location.

9. The computer readable medium of claim 1 wherein the step of choosing an initial tile further comprises:
    determining a latitude and a longitude associated with the candidate area location;
    converting the latitude and the longitude to a tile code by interleaving a first digit of the latitude with a first digit of the longitude, interleaving a second digit of the latitude with a second digit of the longitude, interleaving a third digit of the latitude with a third digit of the longitude, and adding a fourth digit of the latitude;
    using the tile code as an index to select the initial tile.

10. The computer readable medium of claim 1 wherein the step of identifying a candidate area location further comprises:
    prompting an individual for an utterance of a general location;
    receiving the utterance of the general location;
    identifying the general location by comparing the utterance of the general location to a first grammar;
    selecting a second grammar such that the second grammar contains features that are located geographically within the general location;
    prompting an individual for an utterance of a specific location;
    receiving the utterance of the specific location; and
    identifying the specific location by comparing the utterance of the specific location to the second grammar.

11. The computer readable medium of claim 1 wherein the plurality of second tiles are substantially surrounding the initial tile.

12. The computer readable medium of claim 1 wherein the step of determining a plurality of second tiles further comprises removing a duplicate feature from the plurality of second grammars.

13. A computerized system for generating a spatially indexed grammar associated with place names, the computerized system comprising:
    a processor;
    a memory coupled to the processor;

a tile-code generation module which partitions a geographical area into a plurality of finite non-overlapping regions and assigns an index to each of the finite regions, the index configured to be determined using a coordinate system by interleaving a first digit of a horizontal coordinate associated with one of the finite regions with a first digit of a vertical coordinate associated with one of the finite regions, interleaving a second digit of the horizontal coordinate with a second digit of the vertical coordinate, interleaving a third digit of the horizontal coordinate with a third digit of the vertical coordinate, and adding a fourth digit of the horizontal coordinate;

a feature generation module which classifies a number of points on each of the place names within each of the finite regions, each of the points comprising names of first level identifiers in an area defined by the finite regions;

a sorting and de-duping module which sorts the place names associated with the place names in each of the finite regions and removes one or more duplicate points within each of the finite regions; and a tile file generation module which generates a list of features and associated speech recognition grammars for at least a first and a second of the finite regions, after the features are sorted and the duplicate features are removed from the first and the second of the finite regions.

14. The system of claim 13 wherein the coordinate system is a latitude and a longitude coordinate system.

15. The system of claim 13 wherein the coordinate system is V and H coordinate system.

16. The system of claim 13 wherein the index is determined by interleaving a first and second characteristic of the coordinate system.

17. The system of claim 13 wherein the index is a 7-byte tile code.

18. A method for matching a spoken location description with data associated with a feature that exists geographically within the coordinate location on the surface of the earth, the method comprising:

determining a coordinate associated with a specific location;

using one or more processors to choose an initial tile and a first grammar associated with the initial tile, the initial tile being substantially centered around the coordinate and defining an area on the surface of the earth and the defined area is a more or less symmetrical shape defined by a coordinate system and can have a spatially proximate relationship to other tiles, the grammar being associated with the initial tile and being derived from feature names of first level identifiers in the area defined by the initial tile and each first level identifier corresponding to a point on the surface of the earth;

obtaining a spoken language description of a point within the specific location;

using one or more processors to compare the point with the data associated with the feature, wherein the first grammar comprises an audio file associated with each of the feature names of the first level identifiers associated with the tile, and wherein the utterance corresponds to a feature from which the first grammar was derived if the spoken language description matches an audio file associated with the first grammar;

querying a geocoding module with text associated with the feature, the text associated with the feature comprises a text representation of the audio file that matched the spoken language description; and providing information associated with the feature.

19. The method of claim 18, wherein the point includes one or more of a street address, an intersection, or a landmark.

20. The method of claim 18 wherein the initial tile is a substantially symmetrical region.

21. The method of claim 18 further comprising providing the information to a location based service.

22. The method of claim 18 wherein the step of choosing an initial tile further comprises:

determining a latitude and a longitude associated with the coordinate; and selecting the initial tile such that a tile code associated with the initial tile corresponds to the latitude and the longitude.

23. The method of claim 18 further comprising:

identifying a general location; and obtaining a spoken language description of the specific location within the general location.

24. The method of claim 23, wherein the step of identifying a general location further comprises:

prompting an individual for the general location; and receiving an utterance from the individual of the general location.

25. The method of claim 23 wherein the step of identifying a general location further comprises determining a latitude and a longitude from a device associated with an individual.

26. The method of claim 23 wherein the step of identifying a general ideation further comprises determining a location of a communication infrastructure associated with an individual.

27. The method of claim 23 wherein the step of identifying a general location further comprises obtaining a city, a state, or a county associated with a user.

28. The method of claim 23 wherein the step of obtaining a spoken language description of a specific location further comprises obtaining a spoken language description of a city.

29. A spatially indexed grammar apparatus comprising:

a place grammar to output a candidate area location associated with a wireless device;

a point coordinate database to output a point coordinate associated with the candidate area location;

an initial tile from a set of tiles, each tile representing a finite non-overlapping region, the initial tile having an associated speech recognition grammar, the initial tile having a relationship to the point coordinate;

a plurality of additional tiles associated with the grammar, the plurality of additional tiles having a spatially proximate relationship to the initial tile;

a voice response system configured to match an utterance to a feature in the speech recognition grammar; and a geocoding module to receive a text-based representation of a feature from the grammar, the feature matching a spoken location description of a first level identifier from a user.

30. The apparatus of claim 29 wherein the place grammar is derived from a U.S. Geographic Information Service State & Topical Gazetteer file.

31. The apparatus of claim 29 wherein the place grammar contains place names, including a state, a city and a neighborhood.

32. The apparatus of claim 29 wherein the point coordinate comprises a latitude and a longitude.

33. The apparatus of claim 29 wherein the point coordinate comprises a V and H coordinate.

34. The apparatus of claim 29 wherein the grammar comprises a first grammar associated with the initial tile and a second grammar associated with the plurality of additional tiles.

35. The apparatus of claim 29 wherein the first level identifier comprises a street address, an intersection, or a landmark.

36. A method for speech recognition using tiles, each tile defines an area on the surface of the earth and the defined area is a more or less symmetrical shape defined by a coordinate system and can have a spatially proximate relationship to other tiles, the method comprising:
- one or more processors using a place grammar to output a candidate area location associated with a wireless device;
- one or more processors using a point coordinate database to output a point coordinate associated with the candidate area location;
- choosing an initial tile from a set of tiles, the initial tile having an associated first speech recognition grammar, the initial tile having a relationship to the point coordinate;
- choosing a plurality of additional tiles, the plurality of additional tiles having a spatially proximate relationship to the initial tile, and an associated second speech recognition grammar; and
- providing a text-based representation of a feature from the first or the second grammar to a geocoding module, the feature matching a spoken location description of a first level identifier from a user, wherein the spoken location description matches an audio file associated with a feature name from the first or the second grammar.

37. The method of claim 36 wherein the step of using a place grammar to output a candidate area location further comprises:
- prompting an individual for the candidate area location;
- receiving an utterance from the individual of the general location; and
- comparing the utterance against the place grammar.

38. A method for speech recognition using tiles, each tile defines an area on the surface of the earth and the defined area is a more or less symmetrical shape defined by a coordinate system and can have a spatially proximate relationship to other tiles, a grammar is associated with each tile and is derived from feature names of first level identifiers in the area defined by the tile and, each first level identifier corresponds to a point on the surface of the earth, the method comprising:
- prompting a user for a general location;
- capturing a first utterance from the user;
- matching the first utterance against a place grammar to determine if the first utterance corresponds to a first feature from which the place grammar was derived, wherein the place grammar comprises an audio file associated with features that fall within the area defined by the tile;
- prompting a user for a specific location;
- capturing a second utterance from the user;
- selecting a portion of the place grammar such that the portion of the place grammar contains feature names of first level identifiers that exist geographically within the geographic area associated with the first feature;
- matching the second utterance against the portion of the place grammar to determine if the second utterance corresponds to a second feature from which the portion of the place grammar was derived;
- determining a coordinate location associated with the second feature;
- using the coordinate location as a basis for an index into a spatially indexed grammar;
- selecting an initial tile using the index;
- prompting the user for a point;
- capturing a third utterance from the user;
- matching the third utterance against a grammar associated with the initial tile to determine if the third utterance corresponds to a third feature from which the grammar associated with the initial tile was derived;
- if the third utterance does not correspond to the third feature determining a plurality of second tiles and comparing the third utterance against a plurality of grammars associated with the plurality of second tiles to determine if the third utterance corresponds to a fourth feature from which the plurality of grammars was derived;
- sending a text-based representation of the point to a geocoding module; and
- playing back information from the geocoding module associated with the text-based representation of the point.

39. A method for speech recognition using tiles, each tile defines an area on the surface of the earth and the defined area is a more or less symmetrical shape defined by a coordinate system and can have a spatially proximate relationship to other tiles, a grammar is associated with each tile and is derived from feature names of first level identifiers in the area defined by the tile and, each first level identifier corresponds to a point on the surface of the earth, the method comprising:
- using a general and a specific location to obtain an initial tile;
- sending a grammar associated with the initial tile to speech recognition software of an interactive voice response system, wherein the place grammar comprises an audio file associated with features that fall within the area defined by the tile;
- matching a spoken utterance of a first level identifier with a feature in the grammar;
- determining if the spoken utterance matches the feature;
- if the spoken utterance does not correspond to the feature determining a plurality of second tiles and comparing the spoken utterance against a plurality of grammars associated with the plurality of second tiles to determine if the spoken utterance corresponds to a feature from which the plurality of grammars was derived;
- sending a text representation of the feature to a geocoding module to determine coordinates for a point matching the spoken utterance; and
- providing the coordinates for the point to a location based service.

* * * * *